(12) United States Patent
Ghare

(10) Patent No.: US 10,127,086 B2
(45) Date of Patent: Nov. 13, 2018

(54) DYNAMIC MANAGEMENT OF DATA STREAM PROCESSING

(71) Applicant: Amazon Technologies, Inc., Seattle, WA (US)

(72) Inventor: Gaurav D. Ghare, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/858,491

(22) Filed: Dec. 29, 2017

(65) Prior Publication Data

US 2018/0121254 A1 May 3, 2018

Related U.S. Application Data

(63) Continuation of application No. 14/875,194, filed on Oct. 5, 2015, now Pat. No. 9,858,124.

(51) Int. Cl.
*G06F 9/46* (2006.01)
*G06F 9/50* (2006.01)

(52) U.S. Cl.
CPC .................... *G06F 9/5083* (2013.01)

(58) Field of Classification Search
None
See application file for complete search history.

(56) References Cited

U.S. PATENT DOCUMENTS

| 7,487,206 B2 | 2/2009 | Gu et al. |
| 7,890,649 B2 | 2/2011 | Gu et al. |
| 8,176,196 B2 | 5/2012 | Katsunuma et al. |
| 8,458,714 B2 | 6/2013 | King et al. |
| 9,858,124 B1 | 1/2018 | Ghare |
| 2008/0270403 A1 | 10/2008 | Bookman et al. |
| 2013/0046901 A1 | 2/2013 | Sabir et al. |
| 2014/0355438 A1 | 12/2014 | Gedik et al. |

OTHER PUBLICATIONS

U.S. Appl. No. 14/077,173, filed Nov. 11, 2013, Theimer, et al.
U.S. Appl. No. 14/570,937, filed Dec. 15, 2014, Meyers.
U.S. Appl. No. 14/875,201, filed Oct. 5, 2014, Ghare, et al.

*Primary Examiner* — Gregory A Kessler
(74) *Attorney, Agent, or Firm* — Robert C. Kowert; Meyertons, Hood, Kivlin, Kowert & Goetzel, P.C.

(57) ABSTRACT

A stream management system may implement dynamic management of a data stream. Utilization data of different partitions of a data stream may be tracked. When routing a data record received at the stream management system, a partition may be dynamically identified for the data recorded. The data record may then be directed to the identified partition. Other management operations, such as repartitioning the data stream or reassigning resources for processing data records in the data stream may be performed based on the utilization data tracked for the partitions.

20 Claims, 10 Drawing Sheets

1

DYNAMIC MANAGEMENT OF DATA STREAM PROCESSING

This application is a continuation of U.S. patent application Ser. No. 14/875,194, filed Oct. 5, 2015, now U.S. Pat. No. 9,858,124, which is hereby incorporated by reference herein in its entirety.

BACKGROUND

As the costs of data storage have declined over the years, and as the ability to interconnect various elements of the computing infrastructure has improved, more and more data pertaining to a wide variety of applications can potentially be collected and analyzed. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In addition to computing platforms, some large organizations also provide various types of storage services built using virtualization technologies. Using such storage services, large amounts of data can be stored with desired durability levels.

Despite the availability of virtualized computing and/or storage resources at relatively low cost from various providers, however, the management and orchestration of the collection, storage and processing of large dynamically fluctuating streams of data remains a challenging proposition for a variety of reasons. As more resources are added to a system set up for handling large streams of data, for example, imbalances in workload between different parts of the system may arise. If left unaddressed, such imbalances may lead to severe performance problems at some resources, in addition to underutilization (and hence wastage) of other resources.

Figure 1:
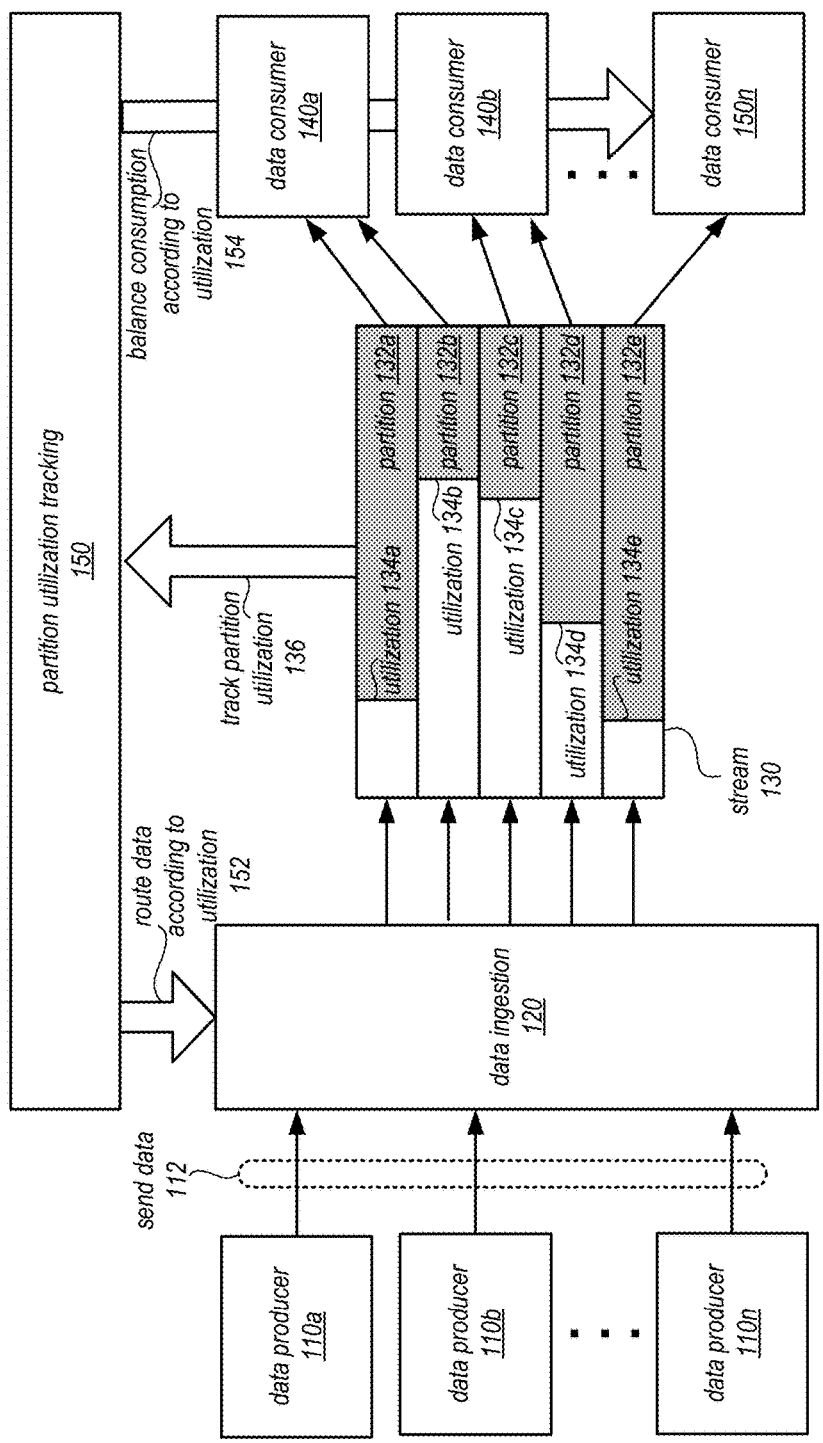
FIG. 1 is a logical block diagram that illustrates dynamic management of data streams, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus to implement dynamic management of data streams are described. The term "data stream", as used herein, refers to a sequence of data records that may be generated by one or more data producers and accessed by one or more data consumers, where each data record is assumed to be an immutable sequence of bytes. A stream management service (SMS) may provide programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. Some types of stream operations (such as stream creation or deletion, or the kinds of dynamic repartitioning operations described below) that involve interactions with SMS control components may be referred to as "control-plane" operations herein, while operations such as data record submissions, storage and retrievals that typically (e.g., under normal operating conditions) do not require interactions with control components may be referred to herein as "data-plane" operations. Dynamically provisioned sets of compute, storage and networking resources may be used to implement the service in some such embodiments, based for example on various partitioning policies that allow the stream management workload to be distributed in a scalable fashion among numerous service components, as described below in further detail. The acronym SMS may be used herein to refer to a stream management service, and also to a stream management system comprising the collection of virtual and/or physical resources used to implement a stream management service.

Some customers of the SMS may develop applications that directly invoke the SMS programmatic interfaces in various embodiments. In at least some embodiments, however, in addition to the SMS interfaces, a higher-level abstraction or application-level processing framework may be provided for customers, which may simplify various aspects of stream processing for those clients that do not wish to develop applications using the lower-level stream management functions supported by the SMS. Such a framework may provide its own programmatic interfaces (built, for example, on top of the SMS interfaces), enabling customers to focus more on the business logic to be implemented using stream records than on lower-level stream management operations. The higher-level framework may be implemented as part of the SMS to provide fully managed data stream.

Fully managed data streams may offer automated resource provisioning for stream processing, automated failovers of processing nodes, predefined processing operations for processing stream data, staged delivery of processed stream data to one or more multiple destinations. In at least some embodiments, the SMS may be implemented as a multi-tenant managed network-accessible service in a virtualization environment. That is, various physical resources (such as computer servers or hosts, storage devices, networking devices and the like) may at least in some cases be shared among streams of different customers in such embodiments, without necessarily making the customers aware of exactly how the resources are being shared, or even making a customer aware that a given resource is being shared at all.

In order to provide scalable storage and processing for data streams, a partitioning scheme may be implemented for a data stream, in some embodiments. Different partitions of a data stream may be implemented to manage resources of the SMS particular to the different partitions of the data stream. In order to determine the partition to which a data record put into the data stream belongs, the partitioning scheme may utilize the values of one or more attributes of the data record, in various embodiments. For example, a value of a particular attribute (which may be referred to as a partitioning attribute) of a given data record may be provided as input to a function which produces an identifier (e.g., a positive number) that can be used as a key to identify a partition for the record. The range of identifiers (e.g., 0 to $(2^128)-1)$) that can be produced by the function may represent a "key space" of the stream, and respective ranges of the identifiers (e.g., key values) may correspond to respective partitions. Consider an example scenario in which a stream S1 of data records which include a "username" attribute as the partitioning attribute has four partitions S1-P0, S1-P1, S1-P2 and S1-P3. If the integers between 0 and 999 (inclusive) are designated as the key space for S1, the key ranges for the four partitions may initially be set to 0-249 (for S1-P0), 250-499 (for S1-P1), 500-749 (for S1-P2) and 750-299 (for S1-P3). The "username" for a given record of the stream may be mapped, e.g., using a selected hash function or some other transformation function, to a number between 0 and 999, and the partition for the record may thereby be selected based on the particular key range in which the number lies. It is noted that using a key range comprising consecutive integers may be considered one specific implementation of a more general approach to partitioning, in which each partition has an associated key set, and not all the keys of a key set may be consecutive integers. Thus, in at least some embodiments, key sets comprising at least some non-consecutive integers may be designated for one or more partitions of a stream.

Processing and delivery of data records in a data stream may be performed on a per partition basis. For example, a partition of the data stream may be assigned to a data consumer or other worker that processes data from the partition that performs one or more processing operations and then sends the data to one or more multiple destinations. The utilization and resulting performance of individual partitions may impact the performance of the data stream as a whole. In order to respond to changes in performance of a data stream dynamically, partition utilization data may be maintained. For example, the processing bandwidth, network bandwidth, and available storage space at the various nodes or components that ingest, store, and process data records in a partition may be tracked in order to gauge the load placed on the partition. Management decisions may then be made with respect to partitions of the data stream based on the utilization data. For example, data records put into the data stream may be routed to underutilized partitions, or the workload of nodes themselves may be balanced (e.g., by reassigning nodes according to a weighting scheme for partitions determined, in part, on utilization data of the partitions. Repartitioning of a data stream, to increase or decrease the number of partitions, may also be performed in response to events detected based on utilization data maintained for partitions of a data stream.

FIG. 1 is a logical block diagram that illustrates dynamic management of data streams, according to at least some embodiments. Data producers, such as data producers 110*a*, 110*b* through 110*n*, may send data 112 to an SMS for ingestion as data records at data ingestion 120. For a fully managed data stream, data producers 110 may be unaware of the partitioning scheme applied to stream 130. Instead, data ingestion 120 may determine which partition data records should include a data record. To route data records, data ingestion 120 may evaluate the partition utilization data tracked 136 for the different partitions so that when a routing decisions is made, utilization data may be accessed in partition utilization tracking 150 in order to route data records according to utilization 152. For example, as illustrated in FIG. 1, the utilization data 134*a* for partition 132*a*, the utilization data 134*d* for partition 132*d*, and the utilization data 134*e* for partition 132*e* indicate a relatively high utilization (with respect to other partitions, 132*b* and 132*c*). Data ingestion 120 may identify either partition 132*b* or 132*c* for processing the data record and direct the data record to the identified partition. Data ingestion 120 (or other component in an SMS implementing routing) may implement various evaluation techniques to identify partitions based on the data, and in some cases based on the data record. For example, the data record may be known to have a high processing cost (e.g., based on the data producer providing the data record). Utilization data may indicate that one partition has high storage utilization but low processing utilization and therefore that partition may be selected even though partitions have more available storage and higher processing utilization.

Dynamic management may also be performed once data is ingested in to a data stream. For example, partition utilization tracking 150 may provide utilization data for repartitioning decision making, provisioning decision making, or resource assignments. In the context of a multi-tenant SMS, the workload of different partitions for different data streams may be balanced across a fleet of nodes that each are assigned to support multiple partitions. For example, data consumers, such as data consumers 140a, 140b through 140n may be multi-tenant, processing data records for partitions of other data streams, in addition to data stream 130. In order to ensure that no data consumer 140 is overloaded, partition utilization tracking 150 may provide utilization data that is used to balance the workload of processing data records with respect to stream 130 and other partitions of data streams which may be assigned to data consumers 140. For example, partition weights may be calculated for partitions 132 based on the respective utilization data 134 of the partitions. Partition weights may indicate the workload of processing data records from a partition. In this way a data consumer's workload may be balanced by making partition assignments that provide an average partition weight in common with other data consumers.

Please note that previous descriptions of dynamic management of a data stream are not intended to be limiting. The illustration provided in FIG. 1 is merely a logical illustration. Different numbers of partitions, types of data consumers and producers may be employed in various stream management systems and configurations.

This specification begins with a general description of a provider network, which may implement a stream management service that provides dynamic management of data streams, either via an interface to the service for a client of the service that performs processing or managed processing of the data stream implemented as part of the stream management service. Then various examples of a stream management service are discussed, including different components/modules, or arrangements of components/module that may be employed as part of providing dynamic management of a data stream hosted in the stream management service. A number of different methods and techniques to implement dynamic management of data streams are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
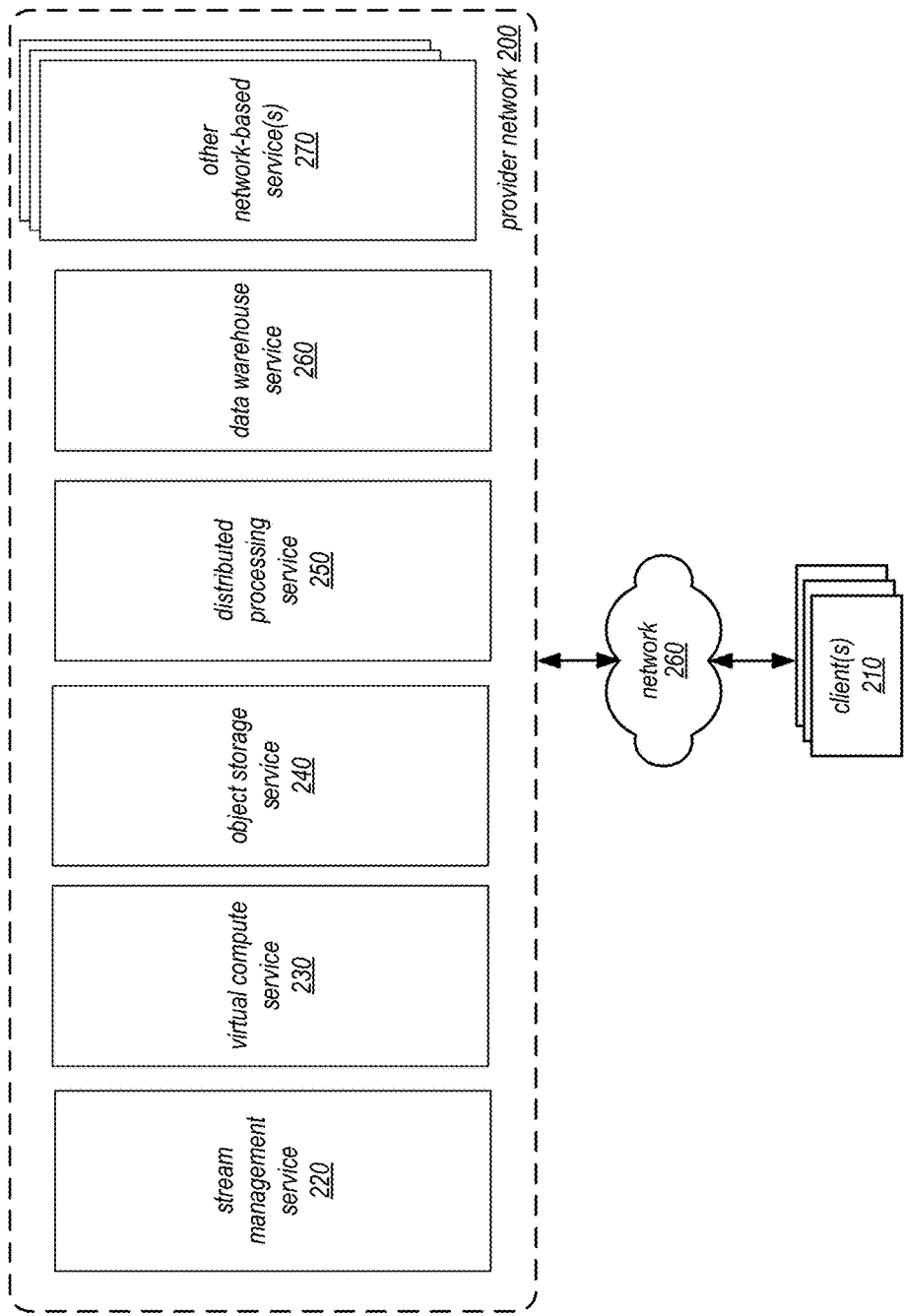
FIG. 2 is a logical block diagram illustrating a provider network that implements a stream management service that provides dynamic management of data streams, according to at least some embodiments.
Figure 3:
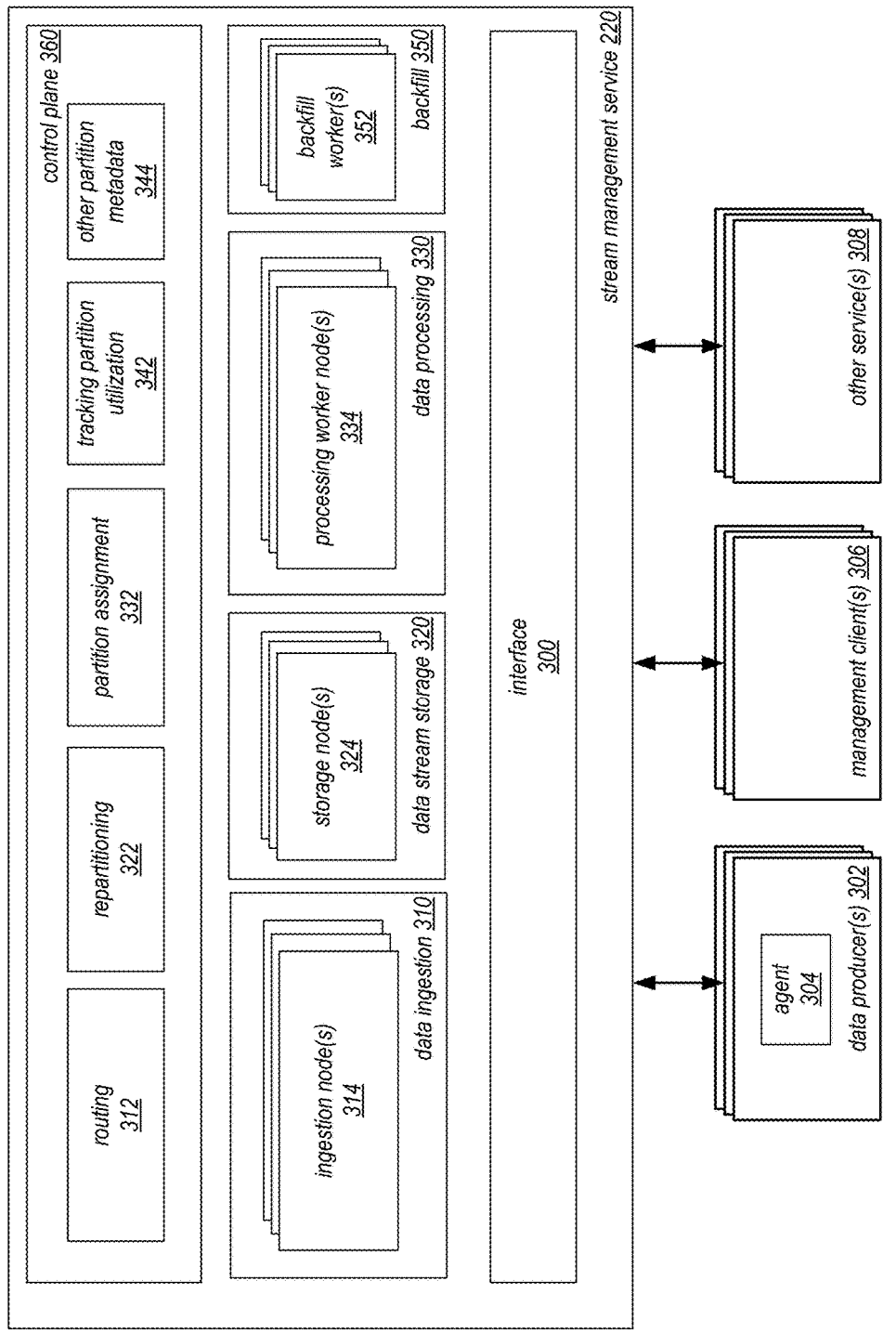
FIG. 3 is a logical block diagram of a stream management service, according to at least some embodiments.

FIG. 2 is a logical block diagram illustrating a provider network that implements a stream management service that provides idempotent processing of a data stream, according to at least some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may a stream management service 220, described in detail below with regard to FIG. 3, provide computing resources, such as virtual compute service 230, storage services, such as block-based storage service 240 and data warehouse service 260, processing services, such as distributed processing service 250, and/or any other type of network based services 270 (which may include various other types of storage, processing, analysis, communication, and security services). Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may be implemented as data producers or data consumers for a data stream managed by stream management service 220 and services such as object storage service 240, distributed processing service 250, and data warehouse service 260 may serve as destinations for data records in the data stream, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by a block-based storage service (not illustrated) in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Object storage service 240 may be implemented, in various embodiments, to provide an object-based data store that provides highly durable storage for data objects. For instance, object-based data store may be implemented as a key-value data store, where a data object is associated with a unique key. The key for the data object is used to access or manage the data object stored in object storage service 240.

Distributed processing service 250 may be implemented, in various embodiments, to provide one or more distributed processing clusters to perform processing jobs on large sets of data. For instance, a data set may be made accessible to one or more processing clusters of distributed processing service 250 on behalf of a customer in order to perform filtering and sorting of data in the data set and processing on the data in accordance with a framework that manages the operations of the cluster to run tasks in parallel, communicate and transfer data amongst nodes in the cluster, and facilitate redundancy and fault tolerance of the data and operations (e.g., as may be provided utilizing a MapReduce framework).

Data warehouse service 260 may be implemented, in various embodiments, to set up, operate, and scale a data warehouse in a cloud computing environment. Data warehouse clusters hosted by the data warehouse service 260 may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

FIG. 3 is a logical block diagram of a stream management service, according to at least some embodiments. Stream management service 220 may ingest data from one or multiple sources for a data stream, store the data in the data stream and provide access to the data for service-provided consumers or processors of the data or externally located (with respect to stream management service) consumers or processors of the data. As illustrated in FIG. 3, data ingestion 310, data stream storage 320, data processing 330, and backfill 350 may implement such functionality on behalf of SMS 220. Data producer(s) 302, management client(s) 306, and other service(s) 308, may interact with SMS 220 via interface 300. Control plane 360 may manage the provisioning, operation, networking, and other operations of the various systems in SMS 220 (e.g., provisioning and/or configuring ingestion nodes(s) 314, storage node(s) 324, processing worker node(s) 334, and backfill worker node(s) 352

Data ingestion system 310 may include one or more nodes 314 or components to ingest data. Nodes 314 of the ingestion system 310 may be configured (e.g., by nodes implementing control plane 360) to obtain data records of a particular data stream from data producers 302. Ingestion nodes 314 may obtain the data records according to a scheme for partitioning the data stream. In some embodiments, the partitioning scheme may be selected by a client of SMS 220 for a data stream such that data records are received from data producer(s) 302 indicating the particular partition to which the data record belongs (e.g., by including a partition key as discussed above). Such data records may be directed to those ingestion node(s) 314 responsible for the particular partition (e.g., nodes assigned to the partition by partition assignment 332). However, even in such cases, as discussed below with regard to FIG. 6, dynamic management of data streams may be implemented to provide a different underlying partition of the data stream than is specified by the client so that routing system 312 may make routing decisions to the underlying partitions based on partition utilization data maintained for the underlying partitions of the data stream.

In some embodiments, a data stream may be fully managed by SMS 220 and data producer(s) 302 may send data records without any direction for partitioning (e.g., with no partitioning key). Data ingestion system 310 (in accordance with decisions performed by routing system 312) may identify a partition of the data stream in order to route the data records to ingestion node(s) 314 for the identified partition (e.g., by assigning a partition key to a data record that corresponds to the partition to which the data record is to be routed). In this way, partition utilization information (which may be tracked by partition utilization tracking 342) may inform routing decisions to ensure that each partition of a data stream is fully utilized. Then ingestion nodes 314 may pass obtained data records on to corresponding storage nodes 324 (provisioned for a partition of the data stream according to partition assignment system 332) of the data stream storage system 320. Storage node(s) 324 may record, save, store or otherwise persist the data records on any of various types of storage devices (which may be performed in accordance with a persistence policy for the data stream).

In order to process the data stream, processing worker node(s) 334 of data processing system 330 may access the storage node(s) 334 corresponding to a partition assigned to the processing worker node (e.g., assigned by partition assignment 332). In some embodiments, processing worker node(s) 324 may act as retrieval nodes that respond to read requests from data consumer(s) 304. For fully-managed data streams, processing worker nodes(s) 324 may act as data consumers, performing operations to process the data records and deliver the data records to specified destination(s) 308, such as another service in provider network 200, like object storage service 240, distributed processing service 250, data warehouse service 260, or other network-based services 270, or to a service, system, or destination outside of provider network 200. Operations to process the data records may be specified by clients, such as discussed below with regard to FIG. 4.

In at least some embodiments, data processing system 330 may provide staged processing and delivery of data in a data stream. For instance, data processing 330 may maintain a workflow, graph, data structure or other representation of multiple stages of operations to be performed or delivered with respect to a data stream. For example, processing worker node(s) 334 may be directed to perform one or more processing operations for data, send the data to another service (e.g., a storage service, such as object store 240), then send a request to another service, such as distributed processing service 250, to access the stored data in the storage service and perform specified processing operations on the data in a distributed processing cluster. The worker processing node(s) 334 may then direct that the processed data from the distributed processing cluster may be stored in data warehouse service 360. State information concerning the state of staged processing for a data stream may be maintained so that the next step or stage of processing data in the data stream may be identified. The workflow, graph, or data structure may indicate the various user identifiers, access keys, objects, configurations, or other information necessary to perform the desired stages. Processing worker node(s) 334 may be configured to perform the various requests, formatted to respective interfaces, such as APIs, which may instigate processing of the stage at a destination. Thus, processing worker node(s) 334 may direct the processing of data in the data stream in addition to performing processing locally, in some embodiments.

Delivery of data for managed data streams may be subject to the availability of a destination to accept the processed data from processing worker node(s) 334. In scenarios where a specified destination is unavailable, backfill system 350 may provide a storage buffer to hold processed data records for later delivery when the specified destination becomes available again. For example, a network partition or outage of the specified destination may result in a processing worker node 334 being unable to deliver data to the specified destination. Instead of blocking processing of data records in the data stream, the processed data records may be provided to backfill 350, which may poll or otherwise determine when the specified destination becomes available. Once available, backfill worker node(s) 352 may emit the processed data to the specified destination.

Figure 7:
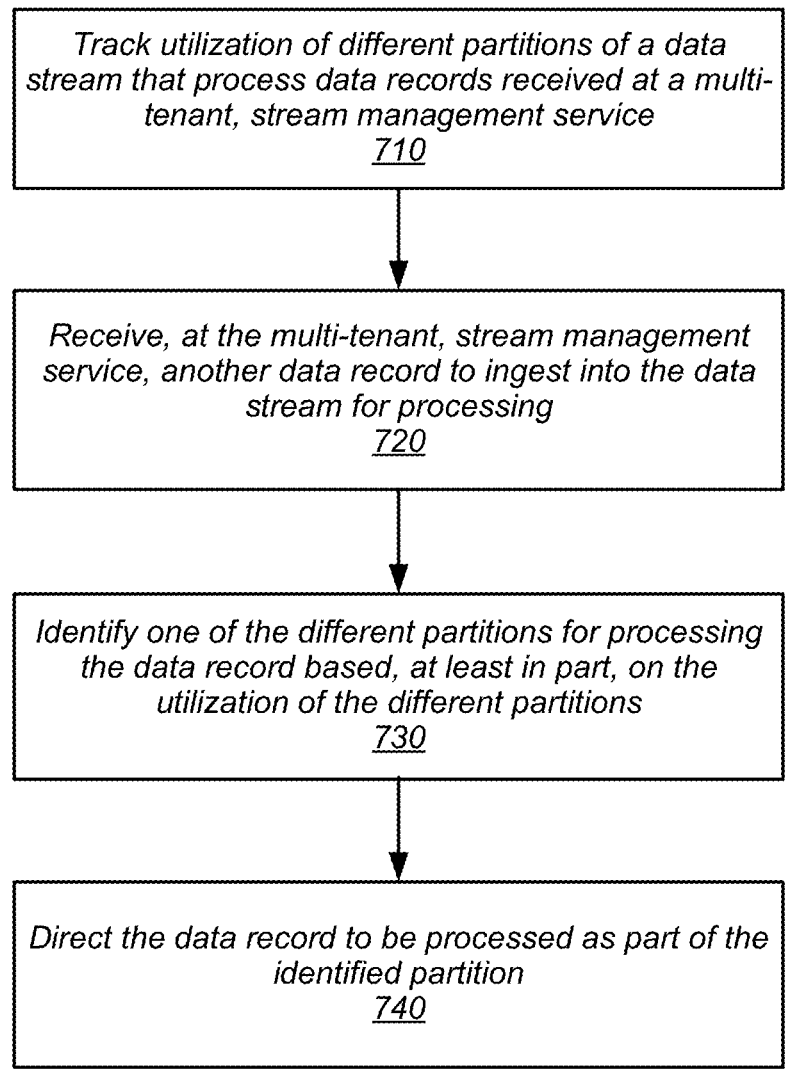
FIG. 7 is a high-level flowchart illustrating various methods and techniques to perform dynamic management of data streams, according to at least some embodiments.

In order to coordinate the operation of various subsystems within SMS 220, control plane 360 may implement various management functions. For example, partition utilization tracking 342 may collect utilization data from ingestion node(s) 314, storage node(s) 324, processing worker node(s) 334, and backfill worker node(s) 352. Partition utilization data may include measures that indicate the utilization of storage (e.g., available storage, such as 10 gigabytes free), network (e.g., available bandwidth, such as 4 mbps), and processing resources (e.g., available processing capacity, unallocated CPU capacity) to perform ingestion, storage, processing and/or backfilling of data in a data stream. The partition utilization data may be aggregated or evaluated on a per partition basis in order to make various control plane determinations. For example, in at least some embodiments, routing 312 may direct data records put into a data stream by a data producer 302 to one of the partitions of a data stream based on the utilization of the different partitions of the data stream (e.g., utilization at data ingestion 310, data stream storage 320, or data processing 330). FIG. 7, discussed below, provides further examples of techniques that may be implemented by routing system 312 to perform routing of data records based on utilization data for partitions.

Figure 8:
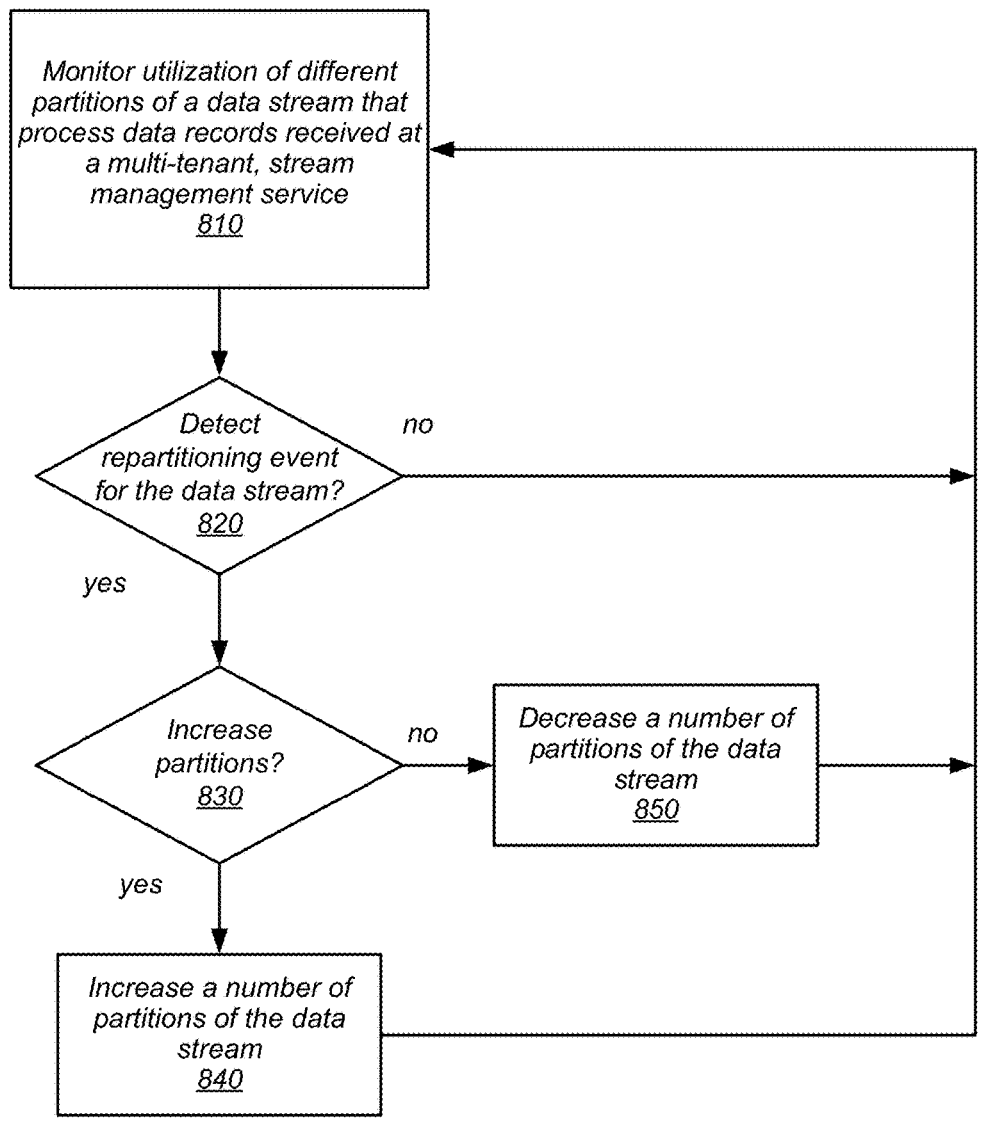
FIG. 8 is a high-level flowchart illustrating various methods and techniques to repartition data streams, according to at least some embodiments.

Similarly, repartitioning system 322, may detect repartitioning events to modify the number (e.g., increase or decrease) of partitions in a data stream automatically (without a user request to repartition) based on utilization data. For example, if utilization data indicates that the throughput capacity of ingestion node(s) 314, storage node(s) 324, or processing worker nodes(s) 334 assigned to the partitions of a data stream is near full utilization, repartitioning 322 may initiate a split operation for one or multiple partitions of the data stream to increase the number of partitions. Thus, repartitioning system 322 may manage the provisioning of additional ingestion node(s) 314, storage node(s) 324, or processing worker node(s) 334 to host or service the new partitions. Note that in a least some embodiments, repartitioning may repartition or reallocate some resources and not other resources (e.g., change the number of storage nodes and not ingestion or processing worker nodes). FIG. 8, discussed below, provides further examples of techniques that may be implemented by repartitioning system 322 to detect when and how to repartition a data stream. Repartitioning system 322 may also be configured to determine an initial partition scheme for a new data stream. Such a determination may be based on historical data, such as the partitioning schemes and performance of prior data streams created with similar features. Historical data may also be associated with a particular client or customer account associated with the new data stream, which may also be evaluated for similarities to identify a partitioning scheme. Machine learning techniques or predictive analysis may be performed on the historical data to identify the partitioning scheme, in some embodiments.

Figure 9:
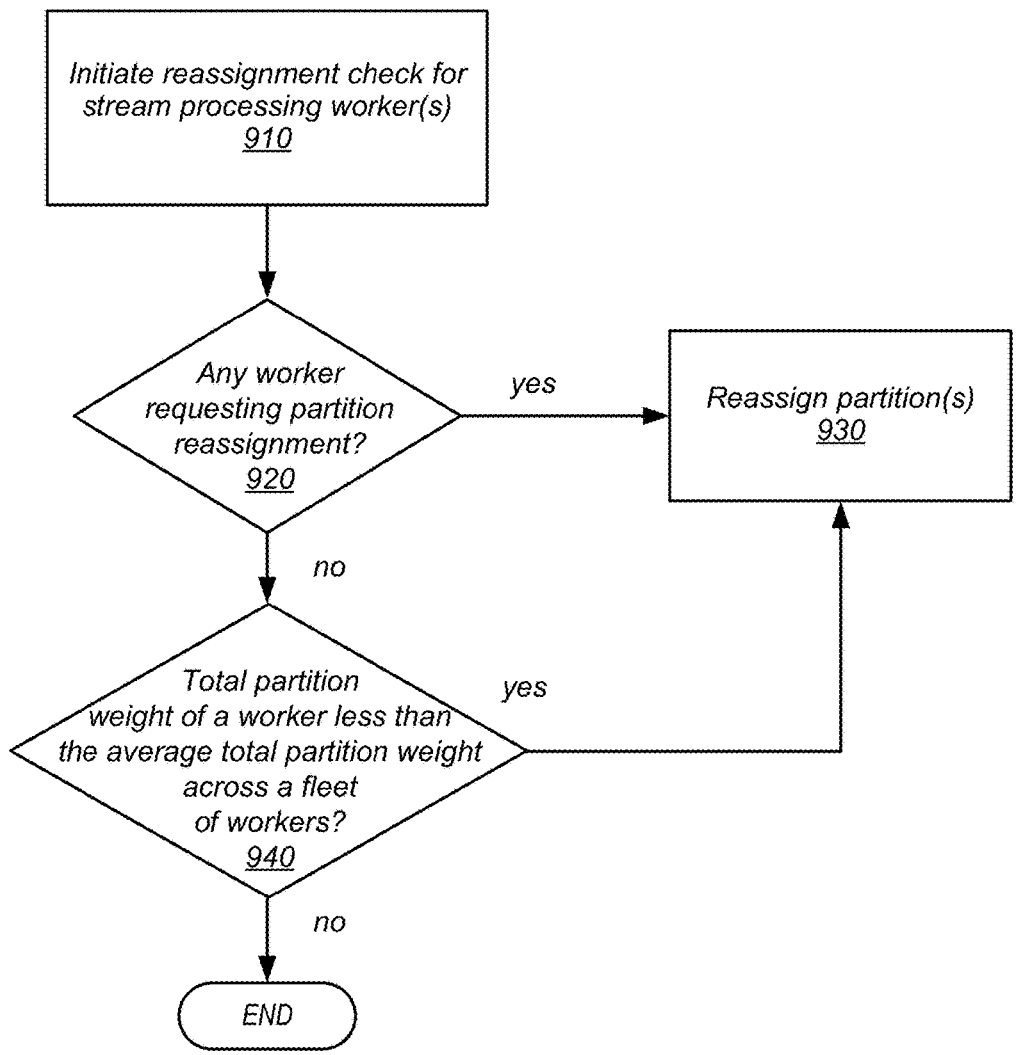
FIG. 9 is a high-level flowchart illustrating various methods and techniques to perform reassignment of partitions for a stream processing worker, according to at least some embodiments.

Partition assignments 332 for the various ingestion node(s) 314, storage node(s) 324, processing worker node(s) 334, and backfill worker node(s) to partitions of respective data streams may be performed based on partition utilization data, whether performed upon creation of a data stream or as part of efforts to balance or redistribute the assignments of partitions in order to more efficiently utilize SMS 220 resources. For example, partition weights may be determined for each partition of a data stream. Assignment of partitions across the nodes may be performed so as to balance the average workload of nodes (instead of assigning the same number of nodes). FIG. 9, discussed below, provides examples of balancing workload across nodes according to a partition weight determined from partition utilization data.

Other partition metadata 344, including information describing the state of a data stream or configuration of a data stream (e.g., partitioning schemes, fully-managed or client-managed) may also be managed, maintained, and utilized by control plane 360.

Figure 4:
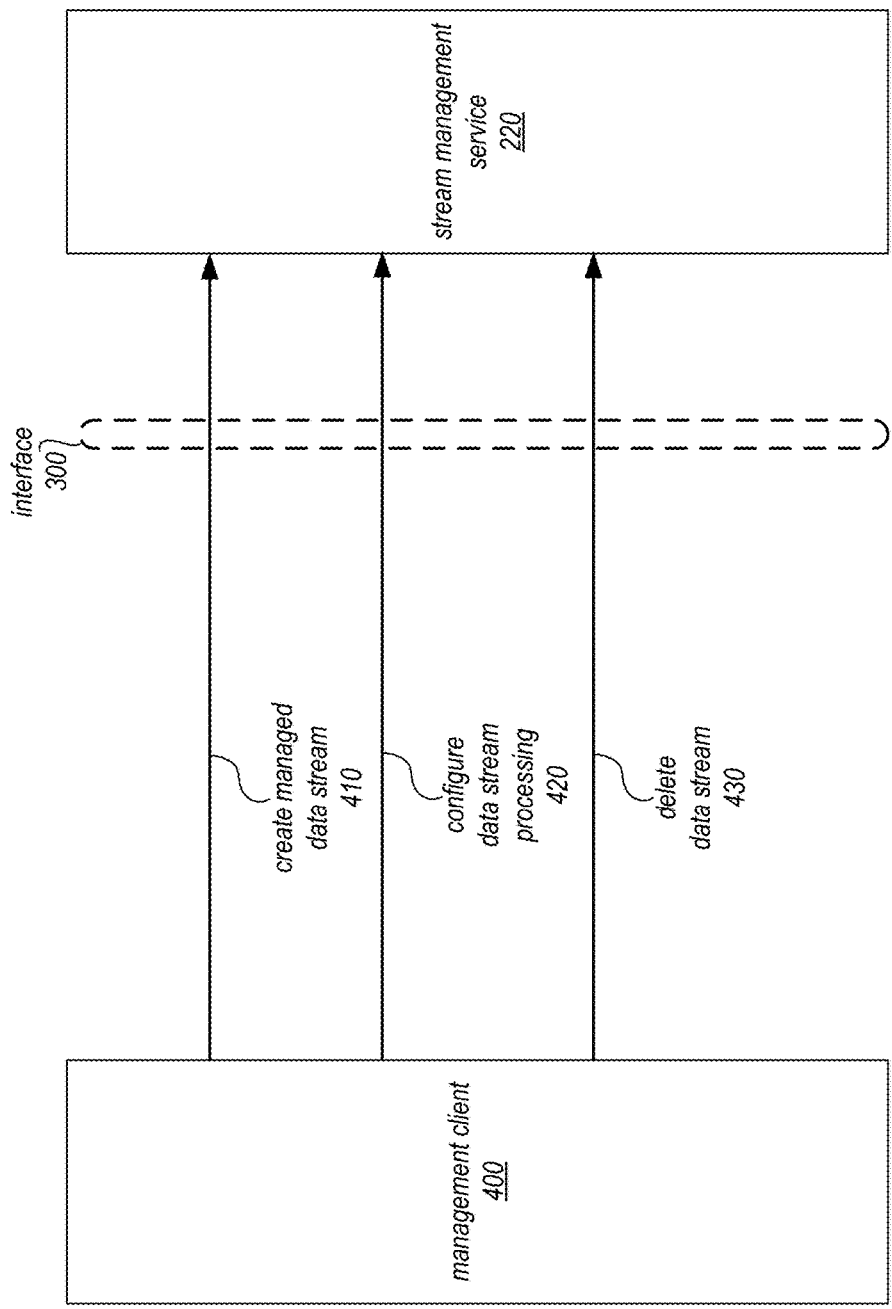
FIG. 4 illustrates interactions between a management client and a stream management service, according to at least some embodiments.

Interface 300 of SMS 220 support one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. FIG. 4, discussed below, illustrate some of the various interactions which may be performed via the programmatic interface 300 of SMS 220.

A number of different types of data producer(s) 302 may generate streams of data in different embodiments, such as, for example, mobile phone or tablet applications, sensor arrays, social media platforms, logging applications or system logging components, monitoring agents of various kinds, and so on. In order to reduce the burden of configuring or managing the interaction of data producer(s) 302 and SMS 220, some data producer(s) 302 may host or implement an agent 326 provided by SMS 220. Agent 326 may be an application, driver, or other component that may be obtained from SMS 220 (e.g., via a download) and installed upon a data producer 302. When a new data record is generated by the data producer, agent 316 may detect the new data record, format the data record for transport to SMS 220, and send via interface 300 the data record to SMS 220 to be put into the data stream (e.g., via a "putRecord" request). In this way, data producers need not develop an application to make user of interface 330 to put data records into a data stream at SMS 220, but instead may rely upon obtaining agent 316 to appropriately upload the data record.

For client-managed data streams, data consumer(s) 304 which are implemented separately from SMS 220 may be configured to access SMS 220 via interface 300. For example, data consumer(s) 304 may implement a client library provided by SMS 220 to utilize requests, such as "getNextRecords" when executing an application to retrieve the next data records to be processed in the data stream. The various techniques discussed below with regard to FIGS. 6 and 7 to perform idempotent processing of data streams may be performed by data consumer(s) 304 or processing worker node(s) 334 (which may perform data consumption for fully managed data streams).

Management client(s) 306 may be like client(s) 210 in FIG. 2, which may interact with SMS 220 via interface 300 in order to create, manage, and/or remove data streams. FIG. 4 illustrates interactions between a management client and a stream management service, according to at least some embodiments. A managed data stream may provide end to end management of a data stream, including detection of data records for a data stream, upload of data records into the data stream, retrieval and processing of data records from the data stream and delivery of the processed data records to one or multiple destinations. Management client 400 may send a request to create a managed data 410 to SMS 220 via interface 300. The request may specify performance characteristics of the data stream (e.g., size of data stream or throughput rate of data through the data stream). The request may specify a buffer limit or rate at which data records are retrieved from the data stream for processing and delivery. For example, the buffer limit may be specified in terms of the amount of time data records may be buffered (e.g., retrieve data records from a stream at a stream processing worker node until a time period expires, then process and emit the data records), the size of data records that may be buffered (e.g., retrieve data records until the total size of data records equals 10 MB), or the number of records that may be buffered (e.g., retrieve up to 50 data records for processing at a time). The specified performance characteristics and buffer limit may also be utilized to determine a partition scheme, and thus the number of partitions, of the new data stream. For example, if the performance characteristics indicate a particular throughput rate, then the number of partitions to provide the particular throughput rate may be calculated, to determine the number of partitions of the new data stream to create.

A request to configure data stream processing 420 may also be sent via interface 300 to SMS 220. The request 420 may specify processing operations to perform. For example, one or more operations of a pre-defined set of operations may be available for selection in the creation request 410. In at least some embodiments, operations may include, but are not limited to, compressing the data records (e.g., according to one or more techniques, such as run-length encoding, Lempel-Ziv, and/or grammar-based encoding), encrypting the data records (e.g., utilizing a public-private key pair encryption mechanism), filtering the data records (e.g., to remove extraneous or unwanted data records), or reformatting data records (e.g., converting data records with data formatted in JavaScript Object Notation (JSON) to comma separated values (CSV), or vice versa). In some embodiments, request 420 may include source code or an executable to be implemented at a stream processing worker in order to perform processing operations with respect to retrieved data records. As discussed above, processing of a managed data stream may also be staged so that multiple destinations and/or operations are utilized to process data records retrieved from a data stream. Request 420 may provide a workflow or other set of instructions to perform the staged operations with respect to the data stream.

A request to delete the data stream 430 may also be sent to SMS 220 via interface 300. SMS 220 may halt processing of the data stream and delete data records in process or hold deletion until all data records in the data stream are processed. SMS 220 may then release the resources provisioned for the data stream (e.g., ingestion node(s) 314, storage node(s) 324, and processing worker node(s) 334) to be provisioned or assigned for other data streams.

Figure 5:
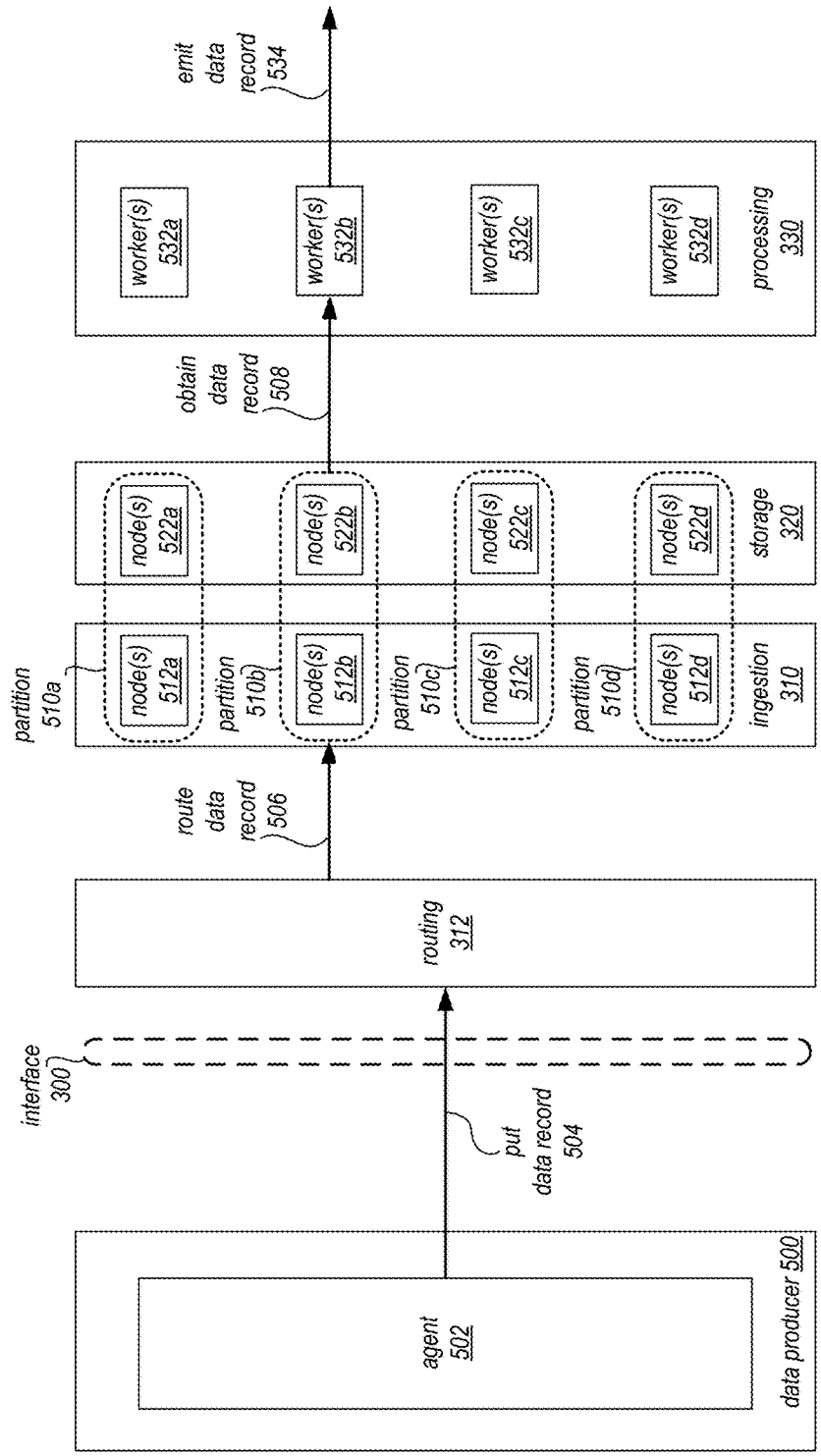
FIG. 5 is a data flow diagram of routing data records in a managed data stream, according to at least some embodiments.

FIG. 5 is a data flow diagram of routing data records in a managed data stream, according to at least some embodiments. In such embodiments, data producers are not aware of partitioning of a data stream. Thus, data produced by data producers is not assigned to a partition at the data producer. As noted earlier, an agent implemented at a data producer may detect and send data records. As illustrated in FIG. 5, agent 502 may detect that data producer 500 has performed an operation (e.g., scan, measurement, or log entry) that creates a data record to be placed into the data stream. Agent 502 may obtain the data, format the data according to interface 300, and put the data record 504 into the data stream.

Routing system 312 may receive an indication of the data record and make a routing decision for the data record to identify the partition for the data record. As noted above, utilization data for the different partitions may be evaluated to identify the partition to process the data record. For example, utilization data may be collected from nodes, 512*a*, 512*b*, 512*c*, and 512*d* of ingestion system 310 and nodes 522*a*, 522*b*, 522*c*, and 522*d* of storage system 320. Each of these nodes may be assigned to a respective partition of the data stream into which the data record is being placed, such as partition 510*a* (with assigned nodes 512*a* and 522*a*), partition 510*b* (with assigned nodes 512*b* and 522*b*) partition 510*c* (with assigned nodes 512*c* and 522*c*), and partition 510*d* (with assigned nodes 512*d* and 522*d*). Note that in a multi-tenant environment these nodes would perform similar functions for other partitions of other data streams as well, but such assignments are not illustrated in FIG. 5. Once identified the partition is identified, which in the illustrated example is partition 510*b*, routing system 312 may route the data record 506 to node(s) 512*b* of ingestion system 310, which may in turn provide the data record to node(s) 522*b* for storage.

The data record may be eventually obtained by a worker assigned to process data records from partition 510. Worker assignments, as discussed above, may also be performed based on the utilization data tracked for the different partitions. For example, the rate at which data records are put into a partition 510 may be determined. The greater the rate at which the data records are put into a partition 510, the higher workload assignment to such a partition may engender. Therefore, a worker may be assigned based on the capacity of the worker to handler the rate at which record are put into the partition. As illustrated in FIG. 5, worker(s) 532*b* may be assigned to partition 510*b*. Thus, worker(s) 532*b* may request and obtain the data record from storage nodes 522*b*, process the data record, and emit the data record 534 to the specified destination.

Figure 6:
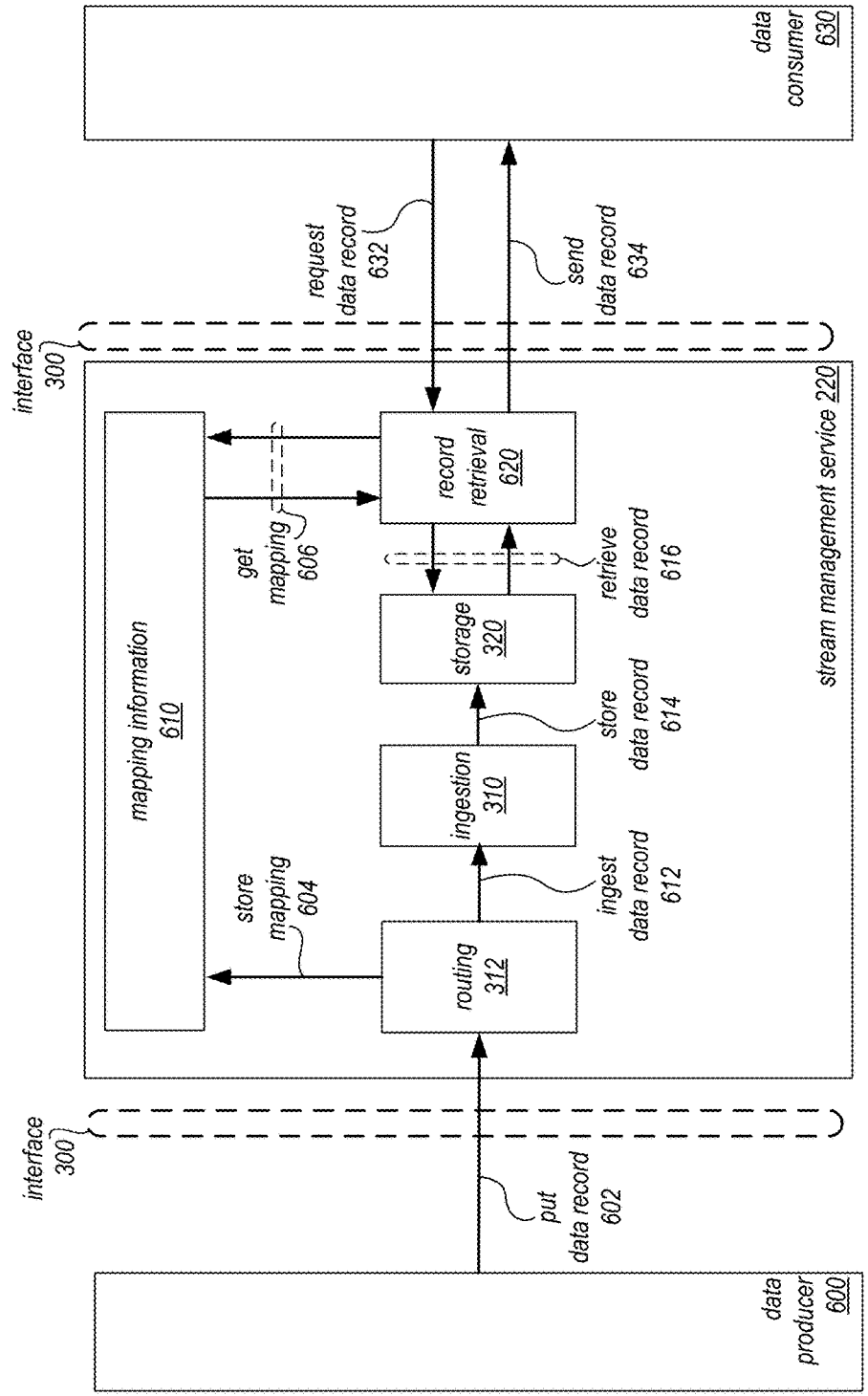
FIG. 6 is a data flow diagram of routing data records for a client-managed data stream, according to at least some embodiments.

Dynamic management of data streams may be implemented in some embodiments without direct exposure to data producers or data consumers. In this way, efficient utilization of SMS resources may be performed without disrupting the expectations of data producers or data consumers. Moreover, customer desired partitions of a data stream may still be preserved even if the SMS utilizes a different partitioning scheme while the data is being hosted at the SMS. FIG. 6 is a data flow diagram of routing data records for a client-managed data stream, according to at least some embodiments.

Data producer 600 may put a data record 602 into a data stream hosted at SMS 220 via interface 300. The put request may include a partition key or other indicator of a desired partition for the data record. Routing system 312 may identify a partition for the data record according to utilization data maintained for partitions of the data stream, as discussed above. Because the partitions of the data stream may be dynamically managed, with a different number of partitions or routing of data records to partitions, the desired partition for the data record may be disregarded by routing system 312. However, the routing system 312 may store a mapping for the data record 604 in mapping information 610 maintained for the partition (e.g., as part of other metadata 344 in FIG. 3) which links the desired partition for the data record with the identified partition determined by routing system 312. Mapping information 610 may maintain the partition scheme that is specified by a client for the data stream and mappings of data records to the different partitions specified by the client when put into the data stream. Mapping information 610 may also map the data record to an underlying partitioning scheme implemented at SMS 202.

Once the underlying partition for the data records is identified, the data record may proceed in a fashion similar to those data records discussed above in FIG. 5. For instance, the data record may be sent 612 to ingestion system 310 (to the appropriate ingestion node for the underlying partition) and then stored 614 in the appropriate storage node(s) in storage system 320.

Data consumer 630 may be a client implemented application (e.g., implementing a client library or other component that interfaces with SMS 220 via interface 300) that retrieves and processes data records in the stream. Data consumer 630 may only be aware of the client-specified partitioning scheme for the stream, and thus may request data records for processing according to the client-specified partition scheme. SMS 220 may implement a record retrieval system 620 (which may be separately implemented or implemented by data processing system 330, including stream processing nodes 334) to handle requests for data records received from data consumer 630. For instance, a request for a data record 632 is received which may indicate a particular partition in which the data record is expected to be stored. Record retrieval system 520 may access mapping information 610 to get the mapping 606 for the data record. The retrieved mapping information may indicate the underlying partition in which the data record is stored. Record retrieval system 520 may then retrieve the data record 616 from the storage node(s) assigned to the underlying partition identified in the mapping, and send the data record 634 back to data consumer 630 for processing.

The examples of dynamic management of data streams as discussed above with regard to FIGS. 2-6 have been given in regard to a stream management service and/or other network-based services. Various other types or configurations of distributed systems processing data from a data stream may implement these techniques. For example, large-scale distributed environments operated by a single business entity may implement dynamic management of data streams for its own applications. Moreover, different configurations of the various modules, components, systems, and or services described above that may implement dynamic management of data streams may be configured to perform dynamic management of data streams. Thus the stream management service discussed above serves as one example context in which many of the stream management and processing techniques described herein may be implemented. However, the techniques discussed below with regard to FIGS. 7-9 may be also implemented using the various components discussed above.

FIG. 7 is a high-level flowchart illustrating various methods and techniques to perform dynamic management of data streams, according to at least some embodiments. As indicated at 710, utilization data of different partitions of a data stream that process records received at a multi-tenant, stream management service may be tracked. For example, reporting agents may be implemented at various components that implement the partitions of the data stream which periodically report utilization metrics for different resources. Networking utilization metrics, for instance, may indicate the network bandwidth consumed by a particular partition. Processing utilization metrics may indicate the amount of processor capacity consumed by the data records already put into the partition of the data stream. In another example, storage utilization metrics may indicate the available storage space, whether in persistent block-based storage (e.g., hard disk storage or solid state storage) or in memory-based storage (e.g., in SRAM or DRAM). Utilization data for partitions may also include information such as the input rate of data records into the partition, the rate at which data records are placed into the partition, or the number of data records in a partition. In this way, dynamic management decisions may account for the various scenarios indicated by the utilization data.

As indicated at 720, a data record may be received at the multi-tenant, stream management service, to ingest into the data stream for processing. In at least some embodiments, the data record may not indicate in which partition of the stream the data record is to be placed. However, even if a particular partition is indicated, a dynamic routing decision may be made to select a different partition. As indicated at 730, one of the different partitions of the stream may be identified for processing the data record based, at least in part on the utilization of the different partitions. Different routing goals, priorities, or schemes maybe implemented. For example, a load balancing routing scheme may be implemented to ensure that one or multiple types of utilization of the partition (e.g., networking, processing, or storage) is evenly distributed across partitions of a data stream. Routing schemes may also account for the overall performance of a partition which may cause routing decisions that prioritize one routing goal over another routing goal. Consider an example where a partition may have significant capacity for additional data records (e.g., available storage, processing, and network bandwidth), but may have a very slow output rate. The slow output rate may indicate that there is a problem at the data processing end of the data stream for the particular partition, and thus a different partition should be selected for the data record, even though the different partition may have less available capacity (and creating an uneven distribution of workload). Other routing decisions may target particular types of data records to partitions optimized to handle that type of data record. For instance, the resources assigned to some partitions may be optimized for high processing workloads, and thus data records received from a data producer that have a high processing cost may be routed to the partition, even though the utilization data for the partition indicates there is less availability to handle the data record than at another partition (which may not be optimized). As a variety of different routing schemes may be implemented that identify partitions based on utilization data tracker for different partitions, the previous examples are not intended to be limiting.

As indicated at 730, once the partition is identified, the data record may be directed to be processed as part of the identified partition. For example, a partition key or other indicator may be assigned which denotes the identified partition for the data record. The data record may be sent or forwarded to ingestion node(s) or other resources that are assigned to the identified partition.

In addition to routing decisions, dynamic management of a data stream may involve changes to the partitioning scheme of the data stream. FIG. 8 is a high-level flowchart illustrating various methods and techniques to repartition data streams, according to at least some embodiments. As indicated at 810, utilization of different partitions of a data stream that processes data records at a multi-tenant, stream management service may be monitored. Monitoring may be based on conditions defined in a repartitioning event. A repartition event may include one or more multiple conditions which may be evaluated utilization data tracked for a data stream, as discussed above at element 710 in FIG. 7. For example, a repartition event may include a consumed processing capacity threshold, consumed networking capacity threshold, and a consumed storage capacity threshold, each of which may be different with respect to the other thresholds (e.g., 70% processing threshold, 80% networking threshold, and 90% storage threshold). Repartitioning events may be triggered when one or multiple conditions are met, in some embodiments. Repartitioning events may also be triggered based on the overall rate at which data records are being placed into the data stream (e.g., a rate change of greater than 30%), or if a destination for a data stream (e.g., from delivering data records to an object store to delivering the data records to a data warehouse), or performance characteristic of the data stream is changed by a client (e.g., an increase in the throughput of the data stream).

The repartitioning event may indicate whether the partitions should be increased or decreased. As indicated at 840, a number of partitions in the data stream may be increased in some embodiments. Increasing the number of partitions may include splitting existing partitions (e.g., reallocating resources, such as storage, processing, or ingestion, assigned to one partition to be assigned to different partitions) or provisioning new resources (e.g., ingestion nodes, storage nodes, and/or worker nodes) to support the new partitions. As indicated at 850, some repartition events may decrease the number of partitions in the data stream. Decreasing the number of partitions may include merging existing partitions (e.g., reallocating resources assigned to multiple partitions to be assigned to one partition) or deallocating resources (e.g., ingestion nodes, storage nodes, and/or worker nodes) from some partitions. Partitioning events may, in some embodiments, change partition mappings maintained by an SMS, indicating a point in time in the sequence of data records at which the partitioning comes into effect. For example, repartitioning may be implemented so that the increased number of partitions are utilized for processing only those data records subsequently put into the data stream (where as in process data records may be processed according to the old partition scheme prior to the repartitioning event).

Dynamic management of resource assignments for partitions of a data stream may also be performed based on utilization data for partitions. Ingestion nodes, storage nodes, or other resources of an SMS may be assigned and reassigned in order to ensure that data streams are processed according to various performance guarantees. As these resources may perform work for multiple different data streams (e.g., multi-tenant), then management of resource assignments may be based on the utilization data of partitions tracked for multiple data streams hosted in the SMS. FIG. 9 is a high-level flowchart illustrating various methods and techniques to perform reassignment of partitions for a stream processing worker, according to at least some embodiments. Note that similar techniques may be performed with respect to other resources in an SMS.

As indicated at 910, a reassignment check may be initiated for stream processing worker(s). A reassignment check may be periodically performed, or performed in response to particular conditions or events. For example, a control plane or worker node may periodically initiate performance or detect a condition that initiates a reassignment check. For example, reassignment checks may be initiated when new workers are added to a fleet of workers, when workers become unresponsive, or when partition utilization data changes an assignment scheme (e.g., partition weights, as discussed above).

Upon initiation of a reassignment check, a determination may be made as to whether any worker in a fleet or group of workers is requesting partition reassignment, as indicated at 920. For example, a worker may implement various monitoring techniques to identify when the workload being processed at the stream processing worker exceeds the capabilities of the worker. If, for instance, the worker has to block processing of one partition of one data stream for a period of time exceeding some threshold, in order to keep up with processing data records from another data stream, then the worker may request that either of the blocked partition or the busy partition be reassigned. A worker may update partition metadata, such as partition metadata 344 maintained in the control plane in FIG. 3, to indicate that particular partition needs to be reassigned. If a worker or control plane detects the request for reassignment, then a reassignment of the partition may be performed, as indicated by the positive exit from 920 to 930. In some embodiments, the reassignment may be based on utilization data for partitions of multiple data streams assigned to potential workers which may be assigned the partition. In some embodiments, multiple partition assignments may be performed to locate a partition assignment efficiently.

In addition to checking for worker requests for reassignment, an assessment may be made of individual workers to determine if the current assignments of the worker are efficient. Different metrics may be generated to determine the workload of a worker. In at least some embodiments, partition weights may be calculated for the partitions assigned to workers. Partition weights may be determined based on utilization data. For example, a partition's weight may be determined from the rate at which data is read for the partition (e.g., in bytes per second). As indicated at 940, the assessment may include comparing the total partition weight of the worker being assessed with the average total partition weight of workers in a fleet. If the total for the worker is less than the average, then a reassignment may be made 930 to increase the total partition weight of the worker beyond the average total partition weight.

The techniques described above may be useful in a number of scenarios. For example, large provider networks may comprise thousands of instance hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed to produce accurate billing records, to determine effective provisioning plans for the data centers of the provider network, to detect network attacks, and the like. The monitoring records may form an input stream to an SMS for scalable ingestion and storage, and the idempotent processing techniques described may be implemented for the analysis of the collected metrics. Similarly, applications to collect and analyze large numbers of log records from numerous log sources (e.g., application logs from the nodes of a distributed application, or system logs from the hosts or compute instances at a data center) may also be able to utilize SMS and idempotent processing functionality. In at least some environments, the processing operations for data records may comprise a real-time ETL (Extract-Transform-Load) processing operation (i.e., an operation that transforms received data records in real time for loading into a destination, instead of doing the transformation offline), or a transformation of data records for insertion into a data warehouse. Using a data stream for loading data into a data warehouse in real time may avoid the delays that are typically required to clean and curate data from one or more data sources, before the data can be inserted into a warehouse for analysis.

A number of different "big data" applications may also be built using the SMS and processing techniques. For example, the analysis of trends in various forms of social media interactions may be performed efficiently using streams. Data collected from mobile phones or tablet computers, such as location information of the users, may be managed as stream records. Audio or video information, collected for example from a fleet of monitoring cameras may represent another category of streaming data set that could be collected and processed in a scalable manner, potentially helping prevent attacks of various kinds. Scientific applications that require analysis of ever-growing data sets, collected for example from weather satellites, ocean-based sensors, forest-based sensors, astronomical telescopes, may also benefit from the stream management and processing capabilities described herein.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 10:
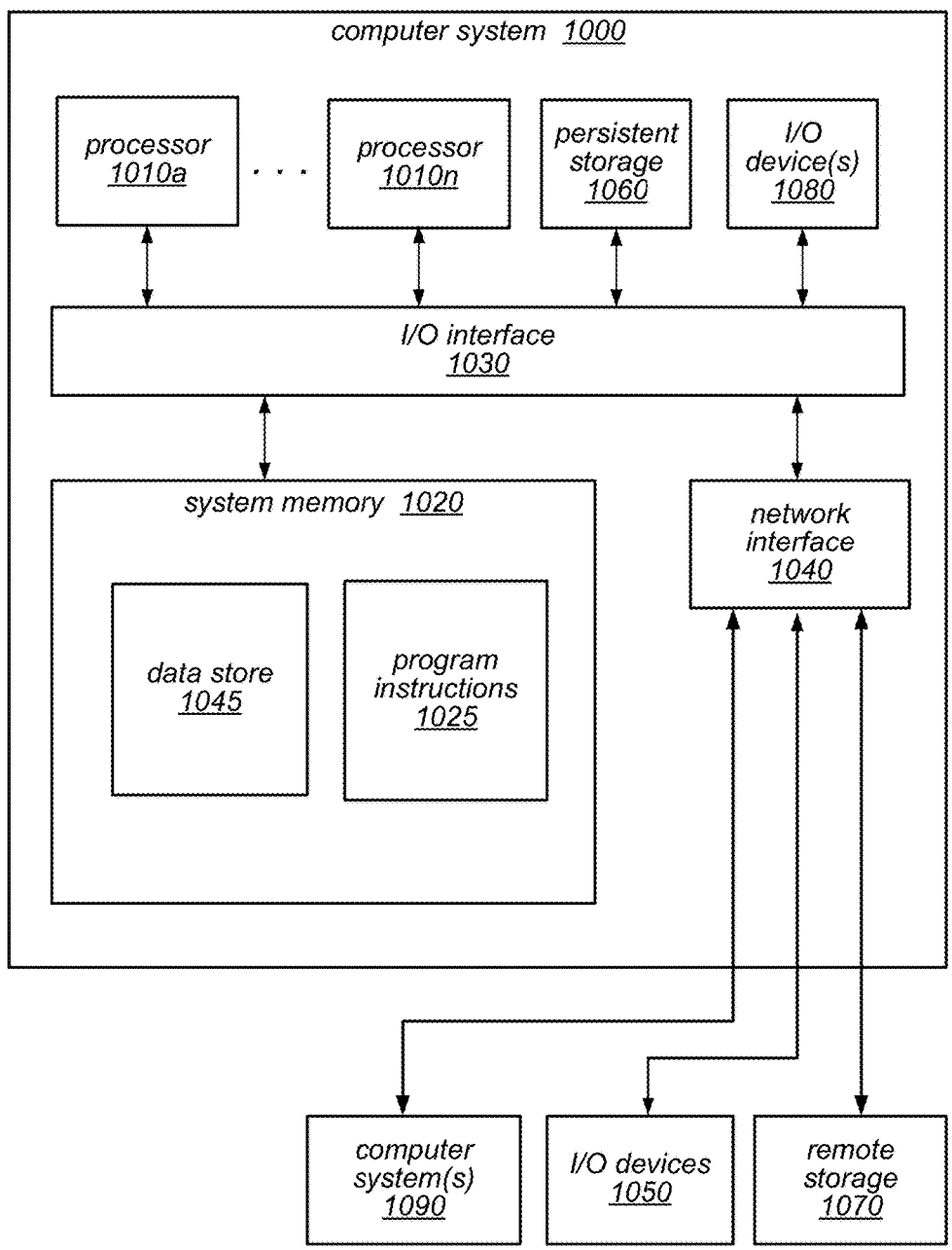
FIG. 10 is a block diagram illustrating an example computing system that may be used in at least some embodiments.

Embodiments of dynamic management of data streams as described herein may be executed on one or more computer systems, which may interact with various other devices. FIG. 10 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a stream management service comprising one or more processors and memory and configured to:
   track utilization of a plurality of partitions of a data stream, wherein the partitions are respectively assigned to individual ones of a plurality of worker nodes of the stream management service, and wherein the partitions respectively comprise a different subset of a plurality of data records of the data stream; and
   reassign a partition of the plurality of partitions from a worker node to another worker node of the plurality of worker nodes based on the utilization of one or more of the plurality of partitions.

2. The system as recited in claim 1, wherein to reassign the partition to the other worker node, the one or more computing devices are configured to:
   determine a rate at which data is read for one or more respective partitions assigned to the other worker node; and
   reassign the partition from the worker node to the other worker node based on the determination of the rate at which data is read for the one or more respective partitions.

3. The system as recited in claim 2, wherein to reassign the partition to the other worker node, the one or more computing devices are configured to:
   determine a total partition weight for the other worker node based on the rate at which data is read for the one or more respective partitions assigned to the other worker node;
   determine that the total partition weight for the other worker node is less than an average total partition weight for the plurality of worker nodes; and
   reassign the partition from the worker node to the other worker node based on the determination that the total partition weight for the other worker node is less than the average total partition weight for the plurality of worker nodes.

4. The system as recited in claim 1, wherein the one or more computing devices are configured to:

initiate a reassignment check for the worker nodes in response to detection of: a new worker node that has been added to the plurality of worker nodes, or one or more of the worker nodes that have become unresponsive; and in response to the initiation of the reassignment check, reassign the partition to the other worker node based on the utilization of one or more of the partitions of the data stream.

5. The system as recited in claim 1, wherein to reassign the partition to the other worker node, the one or more computing devices are configured to:

request, by the worker node, that the partition be reassigned based on the utilization of one or more of the partitions assigned to the worker node; and in response to the request, reassign the partition from the worker node to the other worker node.

6. The system as recited in claim 1, wherein the one or more computing devices are configured to:

track utilization of a plurality of other partitions of another data stream, wherein the other partitions are respectively assigned to individual ones of the plurality of worker nodes, and wherein the other partitions respectively comprise a different subset of a plurality of data records of the other data stream; and reassign the partition of the plurality of partitions from the worker node to the other worker node based on the utilization of the one or more of the plurality of partitions of the data stream and the utilization of one or more of the other partitions of the other data stream.

7. The system as recited in claim 6, wherein to reassign the partition to the other worker node, the one or more computing devices are configured to:

determine a rate at which data is read for one or more respective partitions of the data stream assigned to the other worker node and one or more respective partitions of the other data stream assigned to the other worker node; and reassign the partition from the worker node to the other worker node based on the determination of the rate at which data is read for the one or more respective partitions of the data stream assigned to the other worker node and the one or more respective partitions of the other data stream assigned to the other worker node.

8. A method, comprising:
performing, by one or more computing devices of a stream management service:

tracking utilization of a plurality of partitions of a data stream, wherein the partitions are respectively assigned to individual ones of a plurality of worker nodes of the stream management service, and wherein the partitions respectively comprise a different subset of a plurality of data records of the data stream; and reassigning a partition of the plurality of partitions from a worker node to another worker node of the plurality of worker nodes based on the utilization of one or more of the plurality of partitions.

9. The method as recited in claim 8, further comprising:
determining a rate at which data is read for one or more respective partitions assigned to the other worker node; and reassigning the partition from the worker node to the other worker node based on the determination of the rate at which data is read for the one or more respective partitions.

10. The method as recited in claim 9, wherein to reassign the partition to the other worker node, the one or more computing devices are configured to:

determining a total partition weight for the other worker node based on the rate at which data is read for the one or more respective partitions assigned to the other worker node;

determining that the total partition weight for the other worker node is less than an average total partition weight for the plurality of worker nodes; and reassigning the partition from the worker node to the other worker node based on the determination that the total partition weight for the other worker node is less than the average total partition weight for the plurality of worker nodes.

11. The method as recited in claim 8, wherein the plurality of worker nodes comprise:

ingestion nodes that obtain the plurality of data records of the data stream from one or more data producers, or storage nodes that persist the plurality of data records on one or more storage devices.

12. The method as recited in claim 8, wherein to reassign the partition to the other worker node, the one or more computing devices are configured to:

requesting, by the worker node, that the partition be reassigned based on the utilization of one or more of the partitions assigned to the worker node; and in response to the requesting, reassigning the partition from the worker node to the other worker node.

13. The method as recited in claim 8, wherein the one or more computing devices are configured to:

tracking utilization of a plurality of other partitions of another data stream, wherein the other partitions are respectively assigned to individual ones of the plurality of worker nodes, and wherein the other partitions respectively comprise a different subset of a plurality of data records of the other data stream; and reassigning the partition of the plurality of partitions from the worker node to the other worker node based on the utilization of the one or more of the plurality of partitions of the data stream and the utilization of one or more of the other partitions of the other data stream.

14. The method as recited in claim 13, wherein to reassign the partition to the other worker node, the one or more computing devices are configured to:

determining a rate at which data is read for one or more respective partitions of the data stream assigned to the other worker node and one or more respective partitions of the other data stream assigned to the other worker node; and reassigning the partition from the worker node to the other worker node based on the determination of the rate at which data is read for the one or more respective partitions of the data stream assigned to the other worker node and the one or more respective partitions of the other data stream assigned to the other worker node.

15. A non-transitory computer-accessible storage medium storing program instructions that, when executed on one or more processors cause the one or more processors to perform:

tracking utilization of a plurality of partitions of a data stream, wherein the partitions are respectively assigned to individual ones of a plurality of worker nodes of the stream management service, and wherein the partitions respectively comprise a different subset of a plurality of data records of the data stream; and reassigning a partition of the plurality of partitions from a worker node to another worker node of the plurality of worker nodes based on the utilization of one or more of the plurality of partitions.

16. The non-transitory computer-accessible storage medium as recited in claim 15, wherein to reassign the partition to the other worker node, the instructions when executed on the one or more processors cause the one or more processors to perform:
   determining a rate at which data is read for one or more respective partitions assigned to the other worker node; and
   reassigning the partition from the worker node to the other worker node based on the determination of the rate at which data is read for the one or more respective partitions.

17. The non-transitory computer-accessible storage medium as recited in claim 16, wherein to reassign the partition to the other worker node, the instructions when executed on the one or more processors cause the one or more processors to perform:
   determining a total partition weight for the other worker node based on the rate at which data is read for the one or more respective partitions assigned to the other worker node;
   determining that the total partition weight for the other worker node is less than an average total partition weight for the plurality of worker nodes; and
   reassigning the partition from the worker node to the other worker node based on the determination that the total partition weight for the other worker node is less than the average total partition weight for the plurality of worker nodes.

18. The non-transitory computer-accessible storage medium as recited in claim 15, wherein the instructions when executed on the one or more processors cause the one or more processors to perform:
   initiating a reassignment check for the worker nodes in response to detection of: a new worker node that has been added to the plurality of worker nodes, or one or more of the worker nodes that have become unresponsive; and
   in response to the initiation of the reassignment check, reassigning the partition to the other worker node based on the utilization of one or more of the partitions of the data stream.

19. The non-transitory computer-accessible storage medium as recited in claim 15, wherein to reassign the partition to the other worker node, the instructions when executed on the one or more processors cause the one or more processors to perform:
   requesting, by the worker node, that the partition be reassigned based on the utilization of one or more of the partitions assigned to the worker node; and
   in response to the requesting, reassigning the partition from the worker node to the other worker node.

20. The non-transitory computer-accessible storage medium as recited in claim 15, wherein the instructions when executed on the one or more processors cause the one or more processors to perform:
   tracking utilization of a plurality of other partitions of another data stream, wherein the other partitions are respectively assigned to individual ones of the plurality of worker nodes, and wherein the other partitions respectively comprise a different subset of a plurality of data records of the other data stream; and
   reassigning the partition of the plurality of partitions from the worker node to the other worker node based on the utilization of the one or more of the plurality of partitions of the data stream and the utilization of one or more of the other partitions of the other data stream.

* * * * *